(12) United States Patent
Kangude et al.

(10) Patent No.: US 7,889,737 B2
(45) Date of Patent: Feb. 15, 2011

(54) LOCALLY ADMINISTERED MAC ADDRESS BASED METHOD FOR SELECTIVELY AND EFFICIENTLY IDENTIFYING ENHANCED VERSION NODES OF STANDARDS

(75) Inventors: Shantanu Kangude, Dallas, TX (US); Harshal S Chhaya, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 880 days.

(21) Appl. No.: 11/565,921

(22) Filed: Dec. 1, 2006

(65) Prior Publication Data

US 2007/0133542 A1 Jun. 14, 2007

Related U.S. Application Data

(60) Provisional application No. 60/741,928, filed on Dec. 2, 2005, provisional application No. 60/742,246, filed on Dec. 5, 2005.

(51) Int. Cl.
*H04L 12/28* (2006.01)
(52) U.S. Cl. ........................................ 370/392; 370/338
(58) Field of Classification Search ................. 370/392, 370/338, 349; 707/3
See application file for complete search history.

(56) References Cited

U.S. PATENT DOCUMENTS

| | | | |
|---|---|---|---|
| 5,566,170 A | 10/1996 | Bakke et al. | |
| 6,157,641 A | 12/2000 | Wilford | |
| 6,577,609 B2 * | 6/2003 | Sharony | 370/312 |
| 6,683,865 B1 * | 1/2004 | Garcia-Luna-Aceves et al. | 370/349 |
| 6,810,520 B2 | 10/2004 | Lu et al. | |
| 6,831,913 B1 | 12/2004 | Vialen | |
| 6,839,345 B2 | 1/2005 | Lu et al. | |
| 7,359,989 B2 * | 4/2008 | Orava et al. | 709/245 |
| 7,408,929 B2 * | 8/2008 | Adachi et al. | 370/389 |
| 7,502,354 B1 * | 3/2009 | Maufer | 370/338 |
| 2004/0100929 A1 | 5/2004 | Garcia-Luna-Aceves | |
| 2004/0246932 A1 * | 12/2004 | Fischer | 370/338 |
| 2005/0138194 A1 | 6/2005 | Lu et al. | |
| 2005/0141545 A1 | 6/2005 | Fein et al. | |
| 2006/0020578 A1 * | 1/2006 | Hood | 707/3 |

FOREIGN PATENT DOCUMENTS

| | | |
|---|---|---|
| WO | 2006007159 A2 | 1/2006 |
| WO | 2006020520 A2 | 2/2006 |
| WO | 2006020520 A3 | 2/2006 |
| WO | 2006027636 A2 | 3/2006 |

\* cited by examiner

*Primary Examiner*—Dang T Ton
*Assistant Examiner*—Wei Zhao
(74) *Attorney, Agent, or Firm*—Steven A. Shaw; W. James Brady; Frederick J. Telecky, Jr.

(57) ABSTRACT

Embodiments of the invention provide a method for selectively identifying nodes implemented enhanced version of a standard by creating a random locally administered MAC address and advertising said random locally administered MAC address as the address that implies a particular amendment of a standard.

8 Claims, 3 Drawing Sheets

LOCALLY ADMINISTERED MAC ADDRESS BASED METHOD FOR SELECTIVELY AND EFFICIENTLY IDENTIFYING ENHANCED VERSION NODES OF STANDARDS

CROSS-REFERENCE TO RELATED APPLICATIONS

This application claims priority to and incorporates by reference U.S. Provisional Application No. 60/741,928, filed Dec. 2, 2005, entitled "Locally administered MAC address based method for selectively and efficiently identifying enhanced version nodes of Institute of IEEE 802 standards," Shantanu Kangude and Harshal Chhaya inventors and U.S. Provisional Application No. 60/742,246, filed Dec. 05, 2005, entitled "Methods for silencing all 802.11 WLAN nodes in a neighborhood but selectively excluding those belonging to a particular amendment enhancement," Shantanu Kangude and Harshal Chhaya inventors.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Embodiments of the invention are directed, in general, to communication systems and, more specifically, to identifying enhanced version nodes in communication systems.

As newer and newer amendments of standards (like Institute of Electrical and Electronics Engineers (IEEE) 802.11n high throughput and 802.11s mesh networking, for example) are standardized, network scenarios with such enhanced nodes co-existing with legacy nodes will be abundant. Newer amendments of standardized protocols can usually operate significantly more efficiently in the absence of legacy nodes. Also, newer amendments can employ advanced mechanisms if they can identify nodes that support the techniques defined in the amendments. Thus, identifying legacy nodes and nodes supporting various different amendments is important to ensure optimum performance in a network. Additionally, newer amendments like 802.11s mesh can employ advanced mechanisms such as congestion control or reservations if they can silence legacy STAtions (STA)s selectively for a certain duration in time. Selectively silencing or selectively excluding the silencing of a particular class of nodes may be useful in other cases as well. For example, to ensure access or no access for a particular class for fairness policies etc.

In IEEE 802.11 protocol, Silencing of nodes is achieved by setting their Network Allocation Vector (NAV)s to certain duration. The challenge is to set the NAV of a particular group/class of nodes. Even if a packet achieves such selective silencing, a further issue is that the nodes that are not silenced can update the NAVs of the silenced nodes and get them out of their silence mode. Such a behavior is prescribed in 802.11e as NAV may be shorted by transmitting nodes when they end their transmission opportunity (TXOP)s. A TXOP is defined by the start time and a maximum duration.

Thus, there is a need to identify legacy nodes and selectively silencing these nodes.

SUMMARY

Embodiments of the invention provide a method for selectively identifying nodes implementing enhanced version of a standard by creating a random locally administered MAC address and advertising the said random locally administered MAC address as the address that implies a particular amendment of a standard.

Also provided is a method to achieve selective silencing of a particular class of nodes and continued contention based access by the remaining nodes for the period of selective silencing.

These and other features and advantages will be more clearly understood from the following detailed description taken in conjunction with the accompanying drawings and claims.

BRIEF DESCRIPTION OF THE DRAWINGS

For a more complete understanding of the disclosure and the advantages thereof, reference is now made to the following brief description, taken in connection with the accompanying drawings and detailed description, wherein like reference numerals represent like parts.

DETAILED DESCRIPTION

Figure 1:
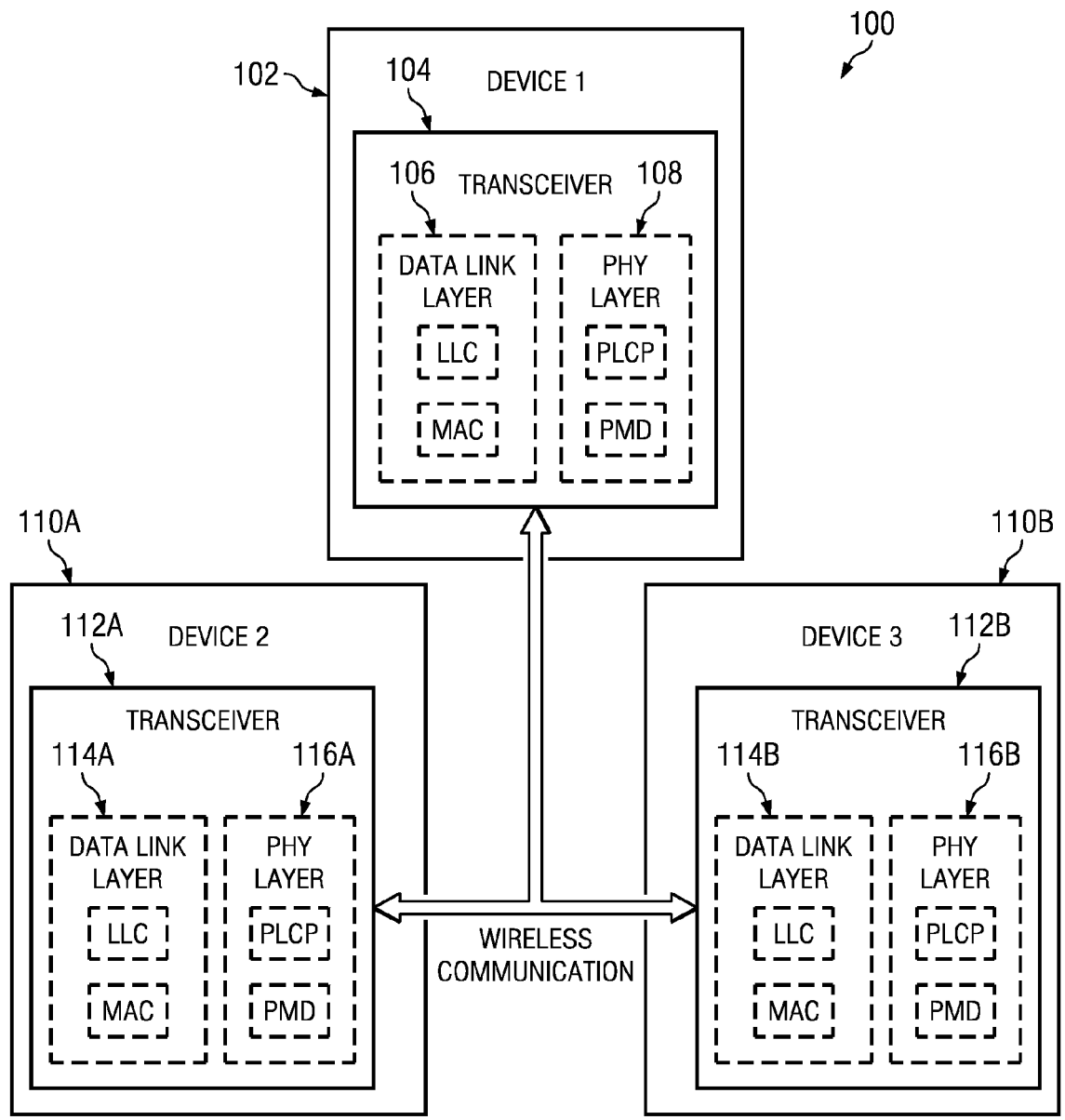
FIG. 1 is a functional block diagram generally illustrative of a wireless system which may use an embodiment of the invention.

It should be understood at the outset that although an exemplary implementation of one embodiment of the disclosure is illustrated below, the system may be implemented using any number of techniques, whether currently known or in existence. The disclosure should in no way be limited to the exemplary implementations, drawings, and techniques illustrated below, including the exemplary design and implementation illustrated and described herein, but may be modified within the scope of the appended claims along with their full scope of equivalents.

System may include many more components than those shown. Generally, nodes may include any device capable of connecting to a wired or wireless network. Such devices include cellular telephones, smart phones, pagers, radio frequency (RF) devices, infrared (IR) devices, integrated devices combining one or more of the preceding devices, and the like. Nodes may also include other devices that have a wireless interface, such as Personal Digital Assistants (PDAs), handheld computers, personal computers, multiprocessor systems, microprocessor-based or programmable consumer electronics, network PCs, wearable computers, and the like.

LANs can employ any form of computer readable media for communicating information from one electronic device to another. LANs can include direct connections, such as through a universal serial bus (USB) port, other forms of computer-readable media, or any combination thereof. Links within LANs typically include fiber, twisted wire pair or coaxial cable, while links between networks may utilize analog telephone lines, full or fractional dedicated digital lines including T1, T2, T3, and T4, Integrated Services Digital Networks (ISDNs), Digital Subscriber Lines (DSLs), wireless links including satellite links, fiber, Asymmetric Digital Subscriber Lines (ADSL), Video Digital Subscriber Lines (VDSL), or other link known to those skilled in the art. Furthermore, remote computers and other related electronic devices can be remotely connected to either LANs or Wide Area Networks (WANs) via a modem and temporary telephone link.

The media used to transmit information in the links illustrates one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Router is typically point of attachment devices on a communications network providing IP (packet-based) connectivity between node and other nodes on a network. On a single network linking many computers through an ad-hoc network of possible connections, router receives transmitted messages and forwards them to their correct destinations over available routes. On an interconnected set of LANs, including those of differing architectures and protocols. A router may act as a bridge or link within LANs, enabling messages to be sent from one to another.

FIG. 1 is a functional block diagram generally illustrative of a wireless system 100 which may use an embodiment of the invention. As shown in FIG. 1, the wireless system may comprise the devices 102, 110A, and 110B. The device 102 may comprise a transceiver 104 having a data link layer 106 and a physical (PHY) layer 108. In at least some embodiments, the device 102 may implement a first wireless protocol (e.g., 802.11g). Similarly, each of the devices 110A and 110B also may comprise a transceiver 112A, 112B having a data link layer 114A, 114B and a PHY layer 116A, 116B. In at least some embodiments, the devices 110A and 110B may be implement a second wireless protocol (e.g., 802.11n).

Figure 2:
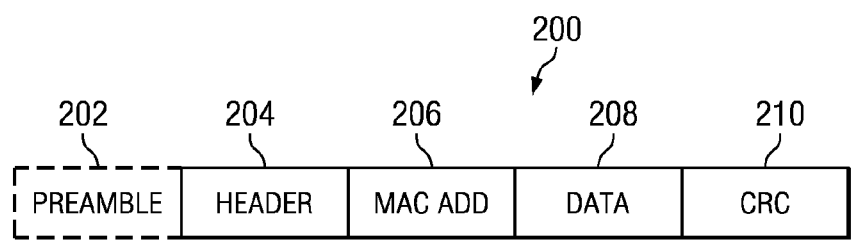
FIG. 2 is a functional block diagram illustrative of an exemplary data packet used for wireless data transmission.

FIG. 2 illustrates an exemplary data packet 200 used for wireless data transmission. As shown in FIG. 2, the data packet 200 may comprise a preamble 202, a header field 204, a Medium Access Control MAC address field 206, a data field 208, and a CRC field 210. The preamble 202 may be used for synchronization and channel estimation. The header field 204 may provide modulation information, convolution coding rate information, and data length (i.e., number of octets) information. The MAC address field 206 may comprise a hardware address that identifies a node of a network. The data field 208 may comprise a variable amount of scrambled data. The CRC field 210 may comprise information for detecting data transmission errors.

In accordance with at least some embodiments of the invention, one or more fields of a data packet 200 may be added and/or modified in order to permit the devices 110A, 110B to transmit data to each other according to the second protocol, and permit the devices 110A, 110B to transmit data to the device 102 using the first protocol and vice versa as previously described. Additionally, adding and/or modifying fields of a data packet 200 may permit the devices 102, 110A, and 110B to estimate the duration of data transfers (used for CCA) according to data rates supported by either the first protocol or the second protocol.

One method to identify all nodes that support the protocol enhancements is to use a special Medium Access Control (MAC) address 206 to refer to all such nodes. Nodes that recognize this special address may take special action on the frame while the legacy nodes may ignore the packet. Once a MAC address based method is used, it is important to design the mechanism such that it does not cause protocol inefficiency due to a large number of amendments for a particular technology. Efficient address matching for nodes that are enhanced with multiple amendments is also addressed.

Using IEEE 802 as an example, transmissions by 802 based nodes usually include one or more 6 byte MAC addresses identifying the immediate transmitter or receiver or previous or later transmitter/receivers etc. The impact of a received frame at a node also depends on the addresses carried in the frames. The 802 MAC address of 0xffffffffffff is well known to mean a broadcast address. Similarly multicast group addresses may be used to identify a group of nodes. Logically, all nodes supporting a particular amendment/enhancement of a particular 802 standard may be identified by a multicast group address. However, most 802 protocols define a subset of addresses as multicast group addresses and define a specific behavior for packets to/from such addresses. Also, such reserved multicast addresses may require group management to recognize group membership. Unicast addresses in frames are capable of causing the most impact on receiving nodes in most protocols. Embodiments of the invention use locally administered unicast addresses to identify all nodes that belong to a particular amendment of a technology.

Depending on the centralized or distributed nature of a given 802 technology, the central coordinator or any individual node randomly chooses a locally administered unicast address to identify a particular amendment of the technology. For example, choose a locally administered MAC address for 11s in an 802.11 network.

If the network is distributed, the chosen address is propagated across the network by whatever mechanism the protocol chooses. If multiple such choices are propagated, the largest value is adopted and propagated.

Nodes use the chosen address to imply all nodes that are capable of the particular amendment. This address may be transmitted in the transmitter or received address or wherever else such address is used. For a particular network, this locally administered address is now reserved to mean all nodes capable of a particular amendment of the base technology.

A transmitter would send the packet to one of these reserved addresses to indicate that the packet has special significance related to a particular enhancement/amendment. A device receiving a packet compares the receiver address of the packet with its own to determine if it needs to process the packet or not. A device supporting newer amendments would also check the packet against a list of reserved addresses to determine if the packet corresponds to one of the enhancements. If the destination address in the received packet matches one of the reserved addresses, the receiver treats the packet as per the enhanced protocol in the amendment.

This reserved address may be used as the transmitter address also. This may imply special meaning for nodes capable of the specific amendment.

Nodes that are enhanced with multiple amendments of an 802 protocol may check for each of their amendments while address matching. For example, a WLAN node that is 11s, 11n, 11k, and 11w capable may have to do address checking for 4 different addresses.

Efficient coding schemes may be used in the last three bytes to identify the amendments so that one address matching operation may identify if the address implies any of a "n" number of amendments of any of "k" number of technologies. One specific method of doing this is to use a method similar to Hamming codes.

Figure 3:
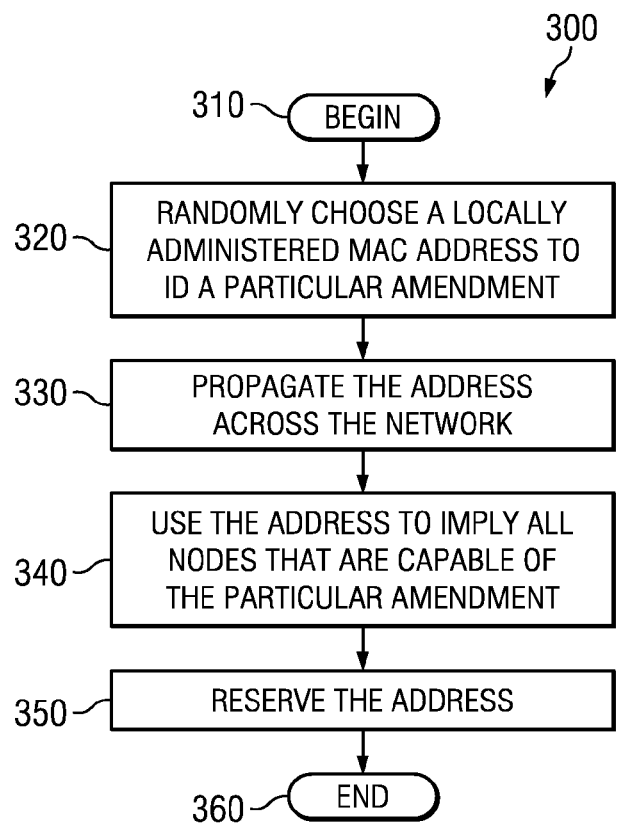
FIG. 3 is method for identifying enhanced version nodes in accordance with an embodiment of the invention.

FIG. 3 is a flowchart showing a method for identifying enhanced version nodes in accordance with an embodiment of the invention. The method begins 310. Once a random address is chosen for a particular amendment 320, the last three bytes of the address are set to all zeros, before it is propagated in the network 330. This address becomes the reserved address 350 for the particular amendment and is propagated in the network.

Addresses set for newer amendments are built on top of the first address set in the network. The last three bytes of any new addresses set to imply all nodes capable of particular amendments 340 are set as follows:

The first "F" bits are reserved to increase the number of amendments that can be covered in the 24 bits space.

The last "L" bits identify the amendment to the technology. This is done via a bit mapping so that "L" amendments may be identified.

If "L" is not enough to cover all amendments to a particular technology, multiple codes in the first "F" bits may be used to increase the space. For each such code, the last "L" bits are bit mapped to identify the amendment.

The method ends 360.

For most nodes, the scheme defined above may lead to only a single address mapping operation. In severe cases, the number of address matching operations might increase to a couple of times. However, it will still be efficient.

With legacy nodes identified, it may be desirable to silence selective nodes. Any packet whose duration field is required to be interpreted by nodes may be used to silence them for certain duration by setting their NAV. In order to selectively change the NAV for nodes belonging to particular amendments, those amendments may need to understand a new behavior that over-rides the usual NAV setting behavior. Such behavior may be specified in all new amendments. A method by which a plurality of nodes except those belonging to a particular amendment may be silenced for a time duration is provided.

Selectively silencing using control frames will now be described. Any control frame that does not carry the Basic Service Set (BSS) ID can set the NAV of all 802.11 nodes that hear it. Specifically a Clear To Send (CTS) frame with any receiver MAC address may be used for silencing nodes. CTS-to-self is an example of one mechanism that uses such approach. However, in order to selectively exclude the silencing of nodes capable of a particular amendment, such nodes need to interpret resetting of the NAV. This involves identification of an indication that a particular amendment is referred.

Figure 4:
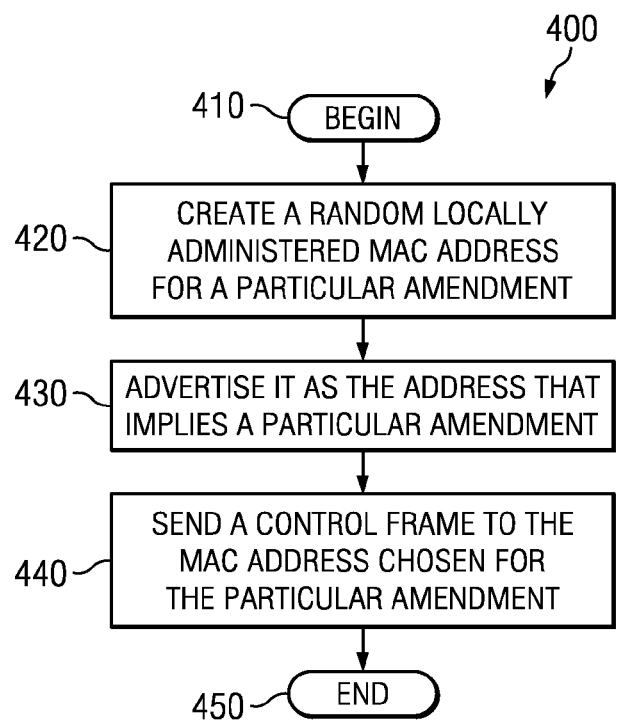
FIG. 4 is method for selectively silencing nodes or causing a control frame induced action in accordance with an embodiment of the invention.

A method in accordance with an embodiment of the invention is described by FIG. 4.

The method begins 410. 802.11 nodes create a random locally administered MAC address for a particular amendment 420 and advertise it as the address that implies a particular amendment 430. In an infrastructure BSS, the Access Point (AP) would choose this address. This address is advertised and propagated cross the network in beacons in an Information Element (IE) with the following information:

ID
Length
Number of Amendments identified "n"
Amendment identifier 1
Locally administered MAC address for Amendment 1
Amendment identifier 2
Locally administered MAC address for Amendment 2
. . .
Amendment identifier n
Locally administered MAC address for Amendment n Amendment identifier is a number or ASCII text that identifies which amendment is being identified with the MAC address that follows it. If multiple addresses are advertised for a particular amendment, the larger value is accepted and further propagated.

In order to selectively exclude silencing of nodes of a particular amendment, a transmitter sends a CTS frame (or any other control flame) to the MAC address chosen for a particular amendment 440. The method ends 450.

All legacy nodes will reject this frame since it does not match their address. They will also set their NAV to the value specified in the 'Duration' field of the frame. All nodes that previously decoded the IE, and are capable of the amendment identified by this special address will treat the frame as if it was unicast to their address. Their NAVs won't be updated and they will be free to access the medium using contention-based or contention free mechanisms.

Selectively silencing within a BSS using management frames will now be described. Any action frame may be used to set the NAV of an entire BSS and silence them. In order to selectively cause nodes capable of a particular amendment to not be silenced, an IE in the action frame can be used to indicate that. The IE format may be as follows:

ID
Length
Amendment identifier

Amendment identifier indicates nodes capable of which amendment are supposed to ignore the NAV setting.

This action frame would be addressed to the same MAC address as the control frame, or be broadcast.

The difference in the two approaches is that the control frame would impact all the nodes in the neighborhood, irrespective of the BSS they belong to. The management frame would affect only the nodes in the same BSS as the transmitter. So the control frame could be used to silence all legacy nodes in a neighborhood, irrespective of their BSS and the action frame would be used to silence only the nodes within a particular BSS. The former method would be used to ensure priority of Wireless Distribution System (WDS) traffic over BSS traffic and the latter to implement congestion control.

After the transmission of any of the above two frame types, the nodes that are not silenced may access the channel and begin a TXOP. The duration field of such packets may sometimes cause the NAVs of all nodes to be changed (except legacy nodes that are previous to 11e). If such a TXOP ends before the time till which nodes were previously selectively silenced, the previously silenced nodes may become active right away. In order to silence the nodes again, the previously transmitted packets used for selective silencing may be transmitted as the last packets of such TXOPs.

Figure 5:
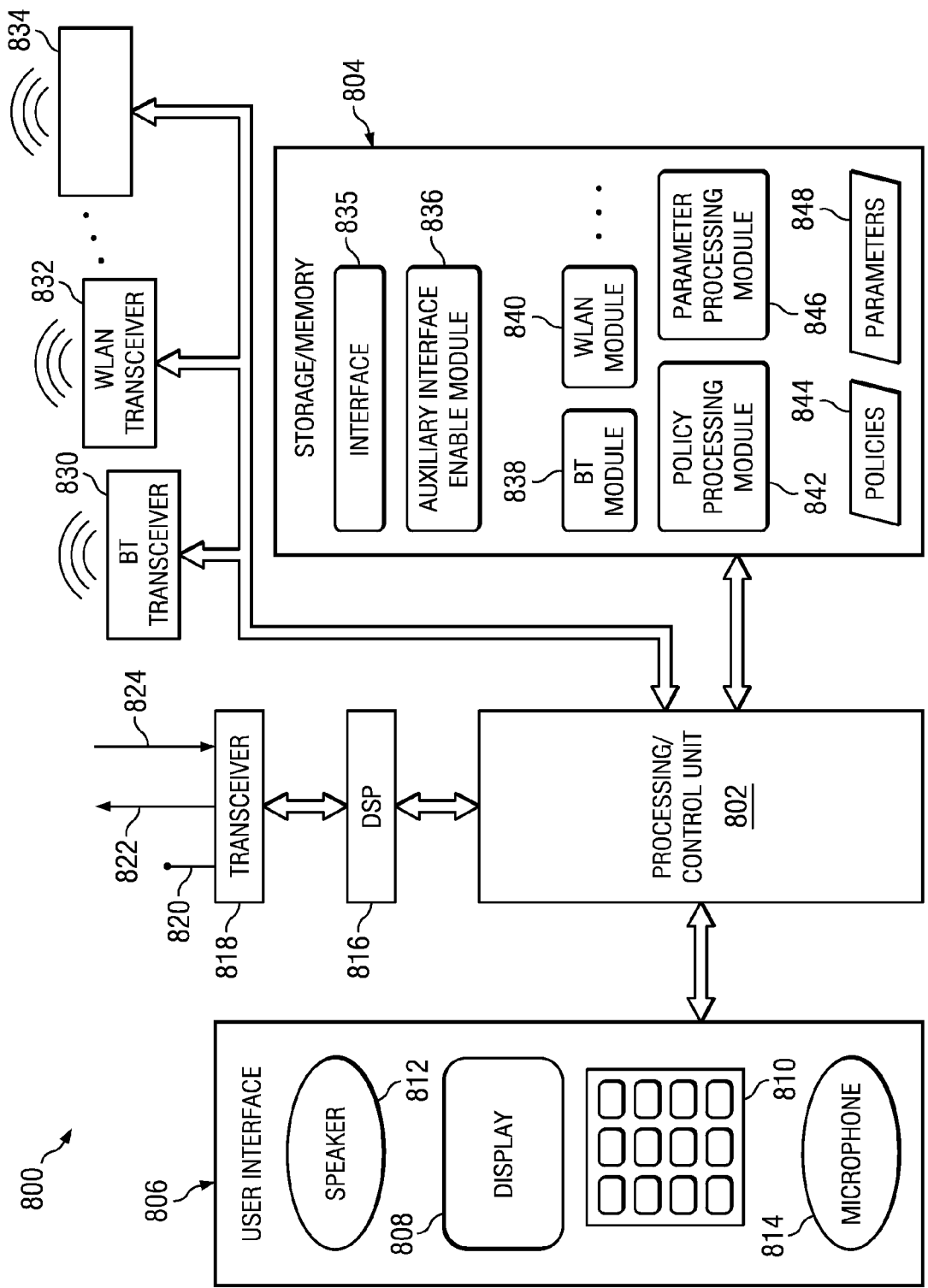
FIG. 5 is a block diagram of a representative example of a mobile device employing principles of the invention.

Hardware, firmware, software or a combination thereof may be used to perform the functions and operations at the mobile devices in accordance with the invention. The mobile devices in accordance with the invention include communication devices capable of engaging in at least one default radio connection, and at least one auxiliary radio connection. These devices include, for example, mobile phones, PDAs, and other wireless communication devices, as well as landline computing systems and communication systems also capable of over-the-air (OTA) communication. A representative example of a mobile device employing principles of the invention is illustrated in FIG. 5.

The representative mobile device 800 utilizes computing circuitry to control and manage the conventional device activity as well as the functionality provided by embodiments of the invention. For example, the illustrated mobile device 800 includes a processing/control unit 802, such as a Digital Signal Processor (DSP), a microprocessor, reduced instruction set computer (RISC), or other central processing module. The processing unit 802 need not be a single device, and may include one or more processors. For example, the processing unit may include a master processor and associated slave processors coupled to communicate with the master processor.

The processing unit 802 controls the basic functions of the mobile device 800 as dictated by programs available in the program storage/memory 804. The storage/memory 804 may include an operating system and various program and data modules associated with the invention. In one embodiment of the invention, the; programs are stored in non-volatile electrically-erasable, programmable read-only memory (EEPROM), flash ROM, etc., so that the programs are not lost upon power down of the mobile device. The storage 804 may also include one or more of other types of read-only memory (ROM) and programmable and/or erasable MOM, random access memory (RAM), subscriber interface module (SIM), wireless interface module (WIM), smart card, or other fixed or removable memory device. The relevant software for carrying out mobile device operations in accordance with the invention may also be transmitted to the mobile device 800 via data signals, such as being downloaded electronically via one or more networks, such as the Internet and an intermediate wireless network(s).

For performing other standard mobile device functions, the processor 802 is also coupled to user-interface 806 associated with the mobile device 800. The user interface (UI) 806 may include, for example, a display 808 such as a liquid crystal display, a keypad 810, speaker 812, and microphone 814. These and other UI components are coupled to the processor 802 as is known in the art. The keypad 810 may include alpha numeric keys for performing a variety of functions, including dialing numbers for I conventional, default cellular communication, and/or effecting auxiliary radio communication. Other UI mechanisms may be employed, such as voice commands, I switches, touch pad/screen, graphical user interface using a pointing device, trackball, joystick, or any other user interface mechanism.

The wireless device 800 may also include conventional circuitry for performing wireless transmissions over the mobile network. A DSP 816 may be employed to perform a variety of functions, including analog- to- digital (A/D) conversion, digital-to-analog (D/A) conversion, speech coding/ decoding, encryption/decryption, error detection and correction, bit stream translation, filtering, etc.

In accordance with the invention, the methods of the embodiments of the invention may be implemented in a silencing interface 835. Additionally, the communicating mobile devices may include at least one radio communication interface that may operate separately or in conjunction with the silencing interface 835. The illustrated embodiment includes a Bluetooth transceiver 830 for communicating via Bluetooth standards. A wireless LAN (WLAN) transceiver 832 provides for wireless communication via a local wireless network, such as in accordance with IEEE 802 standards. Any other auxiliary, radio communication interface may instead, or in addition, be used in accordance with the present invention, as depicted by the respective transceiver 834.

In accordance with the invention, the communicating mobile devices include at least one auxiliary radio communication interface that may operate separately or in conjunction with a silencing interface 835. The illustrated embodiment includes a Bluetooth transceiver 830 for communicating via Bluetooth standards. A wireless LAN (WLAN) transceiver 832 provides for wireless communication via a local wireless network, such as in accordance with IEEE 802 standards. Messages exchange to silence nodes in accordance with the invention may be provided by WLAN transceiver 832. Any other auxiliary; radio communication interface may instead, or in addition, be used in accordance with the invention, as depicted by the respective transceiver 834.

A transceiver for cellular communication may also be used. Transceiver 818, generally coupled to an antenna 820, transmits the outgoing radio signals 822 and receives the incoming radio signals 824 associated with the mobile device 800. For example, signals 822, 824 may represent the message exchange to silence nodes in accordance with the invention. This message exchange may be conducted via a Radio Access Network (RAN) associated with a cellular network, such as Global System for Mobile communications (GSM), Universal Mobile; Telecommunications System (UMTS), Personal Communications Service (PCS), Time I Division Multiple Access (TDMA), Code Division Multiple Access (CDMA), or other mobile network transmission technology.

It should be noted that any of the transceivers illustrated in FIG. 5 may be implemented as a modular transceiver including both transmitting and receiving circuitry, or any of such transceivers may alternatively be implemented as discrete transmitter and receiver circuits. As used herein, a "transceiver" is intended to describe circuits or other modules for wirelessly transmitting and receiving information, regardless of whether the transmitter and receiver circuits are discrete components or collectively provided in a single package. I In the illustrated embodiment, the storage/memory 804 stores the various client programs and data associated with the present invention. For example, the storage 804 includes an auxiliary interface enable module 836, which may include program instructions for enabling power to a particular one or more of the auxiliary radio communication interfaces. The auxiliary interface enable module 836 recognizes that Bluetooth is the desired auxiliary radio interface, and together with the processing unit 802 may power on, or otherwise enable for communication, the Bluetooth-related circuitry such as the Bluetooth transceiver 830 to enable its operation. It should be recognized that additional hardware (not shown) to enable power to such transceivers 830, 832, 834 may also be implemented.

In addition to the various transceiver circuits 830, 832, 834, associated software modules may be provided to assist in the operation of the particular auxiliary radio communication methodology employed. For example, where Bluetooth is the desired auxiliary radio interface, a Bluetooth program module 838 may include software operable via the processing unit 802 and operable to communicate information via the Bluetooth transceiver 830. Similarly, a WLAN module 840 may include program instructions operable via the processing unit 802 and operable to communication information via the WLAN transceiver 832. The storage/memory 804 may also include a policy processing module 842 for processing policies 844. A parameter processing module 846 may be provided to process parameters 848 that may be received via the messages and/or stored at the storage/memory 804.

Communication information may be sent from one communication device to another communication device(s) via a communication interface 835. The interface 835 may be configured to implement embodiments of the invention. This includes, for example, sending the information via a GSM/GPRS, TDMA, CDMA, PCS, or any other cellular network infrastructure.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method for selectively identifying nodes implementing enhanced version of a standard, said method comprising:
    creating a random locally administered Medium Access Control (MAC) address;
    advertising said random locally administered MAC address as the address that implies a particular amendment of the standard;
    propagating said random locally administered MAC address across a network using a plurality of beacons, in an Information Element;
    reserving said random locally administered MAC address to mean those nodes which are implementing said particular amendment;
    sending, through a transceiver, a packet addressed to at least one of the reserved addresses to indicate that the packet has special significance related to said particular amendment, wherein said address is built on top of a first address set in the network the last three bytes of said address is set to imply all nodes implementing said particular amendment are set comprising:
        a first "F" bits are reserved to increase the number of amendments that are covered in a 24 bits space; and
        a last "L" bits identify said amendment to a technology, this is done via a bit mapping so that "L" amendments are identified.

2. The method of claim 1, further comprising:
    receiving the packet at a receiver;
    comparing the address of the packet with a receivers address and that of the specially reserved addressed; and
    determining if the receiver needs to process the packet or not.

3. The method of claim 1, further comprising:
    checking the address of the packet against a list of reserved addresses to determine if the packet has special meaning for nodes implementing one of the enhancements; and
    treating the packet as if it was addressed to all nodes implementing the specific amendment, or as per an enhanced protocol in the amendment, if the destination address in the received packet matches one of the reserved addresses.

4. The method of claim 1, wherein multiple codes in the first "F" bits are used if "L" is not enough to cover all amendments to a particular technology.

5. A method for selectively silencing nodes of standards, said method comprising:
    creating at least one random locally administered Medium Access Control (MAC) address;
    advertising said random locally administered MAC address as the address that implies a particular amendment of a standard;
    propagating said random locally administered MAC address across a network using a plurality of beacons in an Information Element (IE);
    selectively exclude silencing of nodes of said particular amendment by sending a control frame to the MAC address chosen for said particular amendment; and
    where if a receiving node is implementing said particular amendment, it does not update its Network Allocation Vector (NAV) according to a duration field in said control frame.

6. The method of claim 5, wherein if multiple addresses are advertised for said particular amendment, said method further comprising:
    accepting the largest valued address for that amendment; and
    propagating this largest valued address for that amendment instead of the rest of the addresses.

7. The method of claim 5, further comprising:
    reject said control frame since it does not match their address; and
    setting the Network Allocation Vector (NAV) to a value specified in a duration field of said control frame, so that all nodes that previously decoded the IE that advertised this special address will treat the frame as if it was unicast to their address, their NAVs won't be updated and they will be free to access a medium using contention-based or contention free mechanisms.

8. The method of claim 5, wherein the control frame is a management frame with a special information element (IE) that identifies that amendment; and
    wherein if the receiving node is implementing the said amendment, it does not update its Network Allocation Vector (NAV) according to the duration field in said management frame.

* * * * *